US010150633B2

(12) United States Patent
Link et al.

(10) Patent No.: US 10,150,633 B2
(45) Date of Patent: *Dec. 11, 2018

(54) SYSTEM AND METHOD FOR METALLIC OBJECT DETECTION IN A MEDIA TRANSPORT SYSTEM

(71) Applicant: Kodak Alaris Inc., Rochester, NY (US)

(72) Inventors: Bruce Link, Rochester, NY (US); John Fagan, Honeoye Falls, NY (US); Thomas Middleton, Scottsville, NY (US); Daniel Phinney, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,665

(22) Filed: Feb. 22, 2017

(65) Prior Publication Data
US 2017/0158447 A1 Jun. 8, 2017

Related U.S. Application Data

(63) Continuation of application No. 14/586,300, filed on Dec. 30, 2014, now Pat. No. 9,617,097.

(51) Int. Cl.
*B65H 7/06* (2006.01)
*B65H 43/04* (2006.01)
(Continued)

(52) U.S. Cl.
CPC .............. *B65H 7/06* (2013.01); *B65H 5/062* (2013.01); *B65H 43/04* (2013.01);
(Continued)

(58) Field of Classification Search
CPC .... B65H 7/06; B65H 43/04; B65H 2511/416; B65H 2511/512; B65H 2511/521;
(Continued)

(56) References Cited

U.S. PATENT DOCUMENTS 5,087,027 A * 2/1992 Acquaviva ............. G03G 15/60
271/165
6,764,068 B1 * 7/2004 Anderson ................ B65H 5/00
270/30.02
(Continued)

FOREIGN PATENT DOCUMENTS

CN 102674045 A 9/2012
CN 102730446 A 10/2012
(Continued)

OTHER PUBLICATIONS

International Search Report and WO dated Jul. 25, 2016 in PCT/US2015/067572.
(Continued)

*Primary Examiner* — Jeremy R Severson
(74) *Attorney, Agent, or Firm* — Hogan Lovells US LLP

(57) ABSTRACT

A system and method of detecting the presence of metallic objects in media to be conveyed in a medium transport system is disclosed. One or more metal detectors are included in the medium transport system to detect the presence of metal in the medium being transported. Signals from the metal detectors are sent to a system processor, which analyzes the signals, and produces proximity, duration, and/or intensity values therefrom. One or more microphones may also be included which detect the sound created as the medium is being transported. The processor computes sound values from the microphone signals, and analyzes the computed sound values along with the proximity, duration, and/or intensity values in order determine if the conveyance of the medium along the transport path should be stopped due to the presence of metal in the media or a jam occurring within the medium transport path.

16 Claims, 16 Drawing Sheets

(51) Int. Cl.
*B65H 5/06* (2006.01)
*H04N 1/00* (2006.01)

(52) U.S. Cl.
CPC ..... *H04N 1/00092* (2013.01); *H04N 1/00326* (2013.01); *H04N 1/00602* (2013.01); *H04N 1/00663* (2013.01); *B65H 2404/611* (2013.01); *B65H 2511/416* (2013.01); *B65H 2511/512* (2013.01); *B65H 2511/521* (2013.01); *B65H 2511/528* (2013.01); *B65H 2515/71* (2013.01); *B65H 2515/714* (2013.01); *B65H 2515/82* (2013.01); *B65H 2553/24* (2013.01); *B65H 2553/30* (2013.01); *B65H 2701/12422* (2013.01); *B65H 2701/173* (2013.01); *B65H 2801/39* (2013.01)

(58) Field of Classification Search
CPC .......... B65H 2515/714; B65H 2515/82; B65H 2553/24; B65H 2553/30; B65H 2701/12422; B65H 2701/173
See application file for complete search history.

(56) References Cited

U.S. PATENT DOCUMENTS

| | | | |
|---|---|---|---|
| 7,556,265 B1 * | 7/2009 | Bakker | B65H 5/062 |
| | | | 271/256 |
| 7,828,279 B2 | 11/2010 | Hammen | |
| 8,740,211 B2 * | 6/2014 | Kato | B65H 39/00 |
| | | | 270/32 |
| 9,395,277 B2 | 7/2016 | Link et al. | |
| 9,617,097 B2 * | 4/2017 | Link | B65H 43/04 |
| 9,850,084 B2 | 12/2017 | Middleton et al. | |
| 9,938,100 B2 | 4/2018 | Link et al. | |
| 2008/0025771 A1 | 1/2008 | Ogawa et al. | |
| 2009/0087207 A1 | 4/2009 | Lida et al. | |
| 2009/0152356 A1 | 6/2009 | Reddy et al. | |
| 2009/0243186 A1 | 10/2009 | Samoto | |
| 2012/0019841 A1 | 1/2012 | Schaertel et al. | |
| 2012/0235929 A1 * | 9/2012 | Hongo | B65H 7/06 |
| | | | 345/173 |
| 2013/0069299 A1 | 3/2013 | Matsuoka et al. | |
| 2013/0077118 A1 | 3/2013 | Komiyama | |
| 2013/0168621 A1 * | 7/2013 | Takahashi | B25C 11/00 |
| | | | 254/28 |
| 2013/0329037 A1 * | 12/2013 | Shakespeare | B65H 43/00 |
| | | | 348/88 |
| 2014/0052697 A1 | 2/2014 | Williams et al. | |
| 2014/0251016 A1 | 9/2014 | Adams, Jr. et al. | |
| 2015/0210502 A1 * | 7/2015 | Ando | B65H 31/26 |
| | | | 271/220 |
| 2016/0018554 A1 | 6/2016 | Link et al. | |
| 2016/0185544 A1 | 6/2016 | Link et al. | |
| 2016/0304305 A1 | 10/2016 | Link et al. | |
| 2017/0158447 A1 | 6/2017 | Link et al. | |

FOREIGN PATENT DOCUMENTS

| | | |
|---|---|---|
| CN | 103662896 A | 3/2014 |
| CN | 103662899 A | 3/2014 |
| EP | 1008542 A1 | 6/2000 |
| JP | 2009166952 A | 7/2009 |
| WO | 2014043178 A1 | 3/2014 |
| WO | 2016109375 A2 | 7/2016 |

OTHER PUBLICATIONS

Office Communication issued in PCT/US2015/067572 regarding Invitation to Pay Additional Fees dated May 17, 2016.
Invitation to Pay Additional Fees with Annex (Communication Relating to the Result of the Partial International Search dated Sep. 21, 2017 issued in PCT/US2017/039054.
Chinese Office Action dated May 24, 2018 in Chinese Patent Application No. 201580074727.7 (Chinese Language Only).

* cited by examiner

SYSTEM AND METHOD FOR METALLIC OBJECT DETECTION IN A MEDIA TRANSPORT SYSTEM

CROSS-REFERENCE TO RELATED APPLICATIONS

This application is a continuation of U.S. patent application Ser. No. 14/586,300, filed on Dec. 30, 2014, which is incorporated herein by reference in its entirety.

FIELD OF THE INVENTION

This invention pertains to the field of indicating medium jams in a medium transport system, and in particular to a method and system to prevent a medium jam by detecting documents with sheets stapled or paper clipped together.

BACKGROUND OF THE INVENTION

In document scanners, and other media transport systems, hardcopy media may sometimes jam as the hardcopy media moves along the media transport path. Objects like staples and paper clips are commonly used to hold hardcopy media containing several sheets together. Before transporting these hardcopy media through the media transport path of document scanners and other imaging devices, the operator typically removes these staples and paper clips. However, sometimes the operator fails to remove these staples and paper clips, or fails to notice them on the media, before the media are transported through the document scanner. These staples and paper clips often cause damage to the hardcopy media, the transport media path, or the document scanners itself. In addition, if two or more hardcopy media attached by a staple or paperclip are transported through the media transport path then information can be lost due to hardcopy media not be imaged properly.

While others have implemented systems to check for staples before documents go from an input tray into a scanner device, these systems are limited in the scope of detection and may miss staples, paper clips, or other objects included in media transported into the system, and thus jams may still occur. In addition, these systems do not provide a way to locate the position of a jam within the media transport system. For example, U.S. Pat. No. 5,087,027 includes a document handler system with a staple detector to detect the presence of staples in documents loaded into an input tray. However, this system only looks for staples in predetermined areas of the document, and only looks for staples while the documents are in the input tray. Some documents do not fit into the input tray, and thus no staples in these documents would be detected before they are passed into the scanner. Additionally, many types of documents, including those of varying sizes, do not have a "preselected" area for a staple. Thus, this system may miss staples in documents where staples are present, but are not in a preselected position on the document that the staple detector is monitoring.

There remains a need for a simple, fast and robust technique to monitor hardcopy media input to a media transport system for staples, paper clips, or other metal objects, and to indicate the location of hardcopy media jams along a hardcopy media transport path should a jam occur.

SUMMARY OF THE INVENTION

The present invention is directed to a method and system of detecting hardcopy media that contain staples, paper clips or other metallic binding clips before the hardcopy media is transported along a medium transport path in a document scanner, or other imaging or media transport device. Document scanners typically include one or more rollers, driven by a motor, for use in conveying the medium along the medium transport path. One or more metal detectors are included in the scanner to detect the presence of metal in the medium being transported. The metal detectors produce signals representing the presence of metal in the proximity of the sensor, which are sent to a processor. The processor analyzes the signals, and produces proximity, duration, and/or intensity values therefrom. One or more microphones are also included in the scanner, and detect the sound created as the medium is being transported. The microphones produce signals representing the sound, which are sent to the processor. The processor computes sound values from the signals, and analyzes the computed sound values along with the proximity, duration, and/or intensity values in order determine if the conveyance of the medium along the transport path should be stopped due to the presence of metal in the media or a jam occurring within the medium transport path.

The processor may be included in a computer system that is part of, or in communication with, the scanner system, including the microphones and metal detectors therein. The processor may execute computer program instructions stored on a non-transitory computer-readable medium which cause the processor to acquire signals from the metal detectors as well as sound signals from the plurality of microphones responsive to the sound generated by a medium being transported along a medium transport in the scanner. The computer-readable medium includes further instructions enabling the processor to determine whether metal is present in the media being transported, and whether a jam has occurred based on the sound signal values according to a detection method, as described in detail below.

Based on the proximity, duration, and/or intensity values and the sound signals received, the processor may change the detection method based upon sensed characteristics of the media. For example, if the proximity, duration, and/or intensity values indicate the presence of metal, the loudness thresholds for indicating a jam may be lowered.

The one or more microphones can detect the sound of a medium jamming over a larger physical area than optical or mechanic methods, which are localized in nature. As a result, one microphone can replace the need for several optical or mechanic sensors. By using multiple microphones, a larger area can be monitored and signals from the multiple microphones can be compared against each other to determine the location of the sound source better than one microphone could. Determining the location of the noise source may be helpful in determining the location of the jam as it is typical for the jam to cause the detected noise, and thus the noise source is often the jam location. However, detecting a jam using only signals from the microphones relies on the noise generated by the hardcopy media wrinkling. When the hardcopy media is bound tightly together with staples, paper clips or other metallic binding clips, the hardcopy media does not always generate sufficient loudness for the processor to stop the hardcopy media transport path based on an analysis of the signals received. In addition, a single hardcopy media with a staple or paper clips or other metallic binding clips may not make any additional noise. By including a metal detector, the conveyance of a medium along the transport path can be stopped before hardcopy media that contain staples, paperclips, or other metallic binding clips are transported too far into the medium transport path, thus lessening the chance of a jam occurring. In addition, by adjusting the sound thresholds when media containing staples, paperclips, or other metallic objects are detected within the system, the medium transport system may be able to better determine when a jam is occurring.

DETAILED DESCRIPTION OF THE INVENTION

The present invention is directed to a media transport system, and in particular to a system and method for detecting staples, paper clips, and other metallic objects attached to hardcopy media within the media transport system. In addition to detecting metallic objects, the system also includes microphones to detect sound profiles of documents being transported through the media transport system, and analyzes these sound profiles to determine the occurrence and location of jams. The method may be carried out using a process stored as instructions on a computer program product. The computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Figure 1:
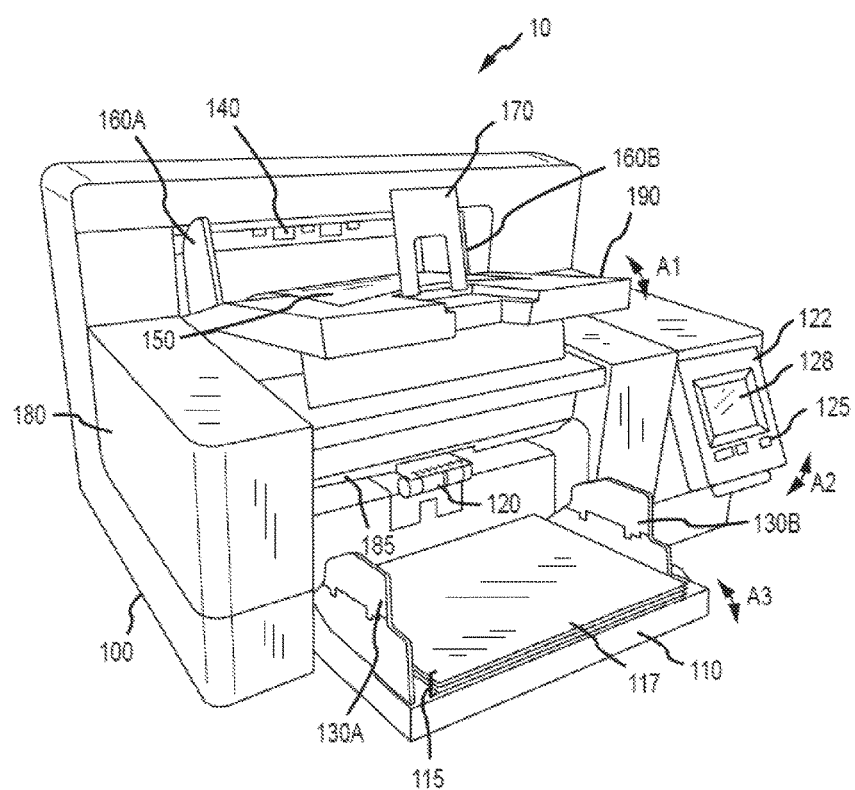
FIG. 1 is a high-level diagram showing the components of medium transport system in the form of an imaging scanner.

FIG. 1 shows a medium transport system 10 that includes a scanner base 100, a scanner pod 180, an input tray 110, an output tray 190, and an operation control panel 122. The scanner pod 180 covers the top surface of the medium transport system 10 and connects to the scanner base 100 with hinges. The hinges allow the document scanner to be opened and closed when there is a media jam within the scanner or when the scanner needs to be cleaned.

The input tray 110 is connected to the scanner base 100 with hinges, allowing the input tray 110 to be opened and closed as illustrated by an arrow A3. The input tray 110 may be opened at times of scanning and closed when the medium transport system 10 is not in use. When the input tray 110 is closed the footprint of the medium transport system 10 can be reduced. Hardcopy media 115 to be scanned is placed into the input tray 110. Examples of the hardcopy media are paper documents, photographic film, and magnetic recording media. The top hardcopy medium 117 is the medium at the top of a stack of hardcopy media 115, and is the next hardcopy medium to be pulled into the scanner by the urging roller 120. The input tray 110 is provided with input side guides 130a and 130b, which can be moved in a direction perpendicular to a transport direction of the hardcopy media 115. By positioning the side guides 130a and 130b to match with the width of the hardcopy media 115, it is possible to limit the movement of the hardcopy media 115 in the input tray 110 as well as set the position (left, right or center justified) of the top hardcopy medium 117 within the media transport path. The input side guides 130a and 130b may be referred to collectively as the input side guides 130. The input tray 110 may be attached to a motor (not shown) that causes the input tray 110 to raise top hardcopy medium 117 to the urging roller 120 for scanning or to lower the input tray 110 to allow additional hardcopy media 115 to be added to the input tray 110.

The output tray 190 is connected to the scanner pod 180 by hinges, allowing the angle of the output tray 190 to be adjusted as shown by the arrow marked A1. The output tray 190 is provided with output side guides 160a and 160b which can be moved in a direction perpendicular to a transport direction of the hardcopy media 115, that is, to the left and right directions from the transport direction of the hardcopy media 115. By positioning the output side guides 160a and 160b to match with the width of the hardcopy media 115, it is possible to limit the movement of the output hardcopy media 150 in the output tray 190. The output side guides 160a and 160b may be referred to collectively as the output side guides 160. An output tray stop 170 is provided to stop the top hardcopy medium 117 after being ejected from the output transport roller 140. When the output tray 190 is in the up state as shown in FIG. 1, the ejected hardcopy media is trail-edge aligned. In the down state, the ejected hardcopy media is lead-edge aligned against the output tray stop 170.

The operator control panel 122 is attached to the scanner base 100 or scanner pod 180, and can be tilted as shown by the arrow marked A2 to allow optimal positioning for the operator. An operation input 125 is arranged on the surface of the operator control panel 122, allowing the operator to input commands such as start, stop, and override. The operation input 125 may be one or more buttons, switches, portions of a touch-sensitive panel, selectable icons on a visual display 128, or any other selectable input mechanism. The override command may allow the operator to temporarily disable multi-feed detection, jam detection, or other features of the scanner while scanning. The operator control panel 122 also includes an operator display 128 that allows information and images to be presented to the operator. As noted above, the operator display 128 could include selectable icons relating to commands and operations of the media transport device. The operator control panel 122 may also contain speakers and LEDs (not shown) to provide additional feedback to the operator.

Figure 2:
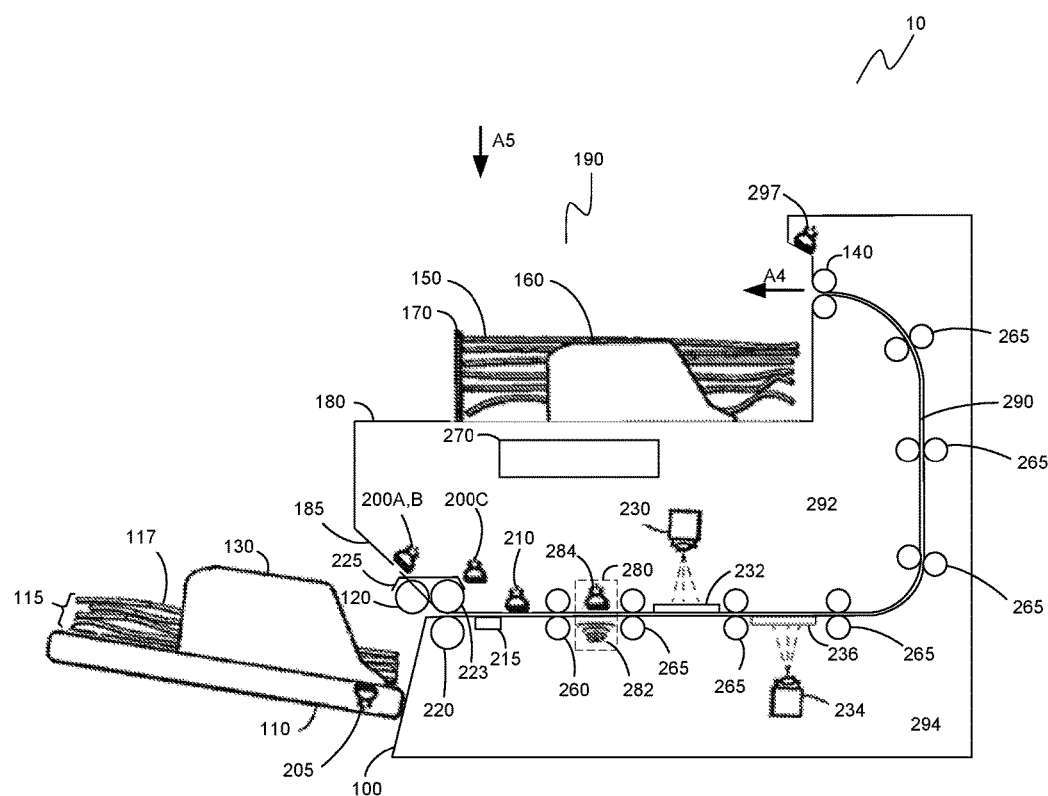
FIG. 2 is a high-level diagram showing the components of a medium transport system.

FIG. 2 illustrates the transport path inside of the medium transport system 10. The transport path inside of the medium transport system 10 has multiple rollers, including urging rollers 120, feed rollers 223, separator rollers 220, take-away rollers 260, transport rollers 265, and an output transport roller 140. The urging rollers 120 and feed roller 223 may be referred to collectively as the feed module 225. Microphones 200a, 200b, 200c, a first media sensor 205, a second media sensor 210, an ultrasonic transmitter 282, and an ultrasonic receiver 284 are positioned along the media transport path 290 to sense media and conditions within the media transport path 290 as the top hardcopy medium 117 is transported through the system. A pod image acquisition unit 230 and a base image acquisition unit 234 are included to capture images of the media.

The top surface of the scanner base 100 forms a lower media guide 294 of the media transport path 290, while the bottom surface of the scanner pod 180 forms and upper media guide 292 of the media transport path 290. A delta wing 185 may be provided which helps to guide the media from the input tray into the media transport path 290. As shown in FIG. 2, the delta wing may be a removable section of the upper media guide 292, transitioning from the upper media guide 292 to the scanner cabinetry of the pod 180. The delta wing may be angled to allow microphones 200 A, B to point into the input tray 110, thereby improving signal pickup.

In FIG. 2, the arrow A4 shows the transport direction that the hardcopy media travels within the media transport path 290. As used herein, the term "upstream" refers to a position relative to the transport direction A4 that is closer to the input tray 110, while "downstream" refers to a position relative to the transport direction A4 that is closer to the output tray 190. The first media sensor 205 has a detection sensor which is arranged at an upstream side of the urging roller 120. The first media sensor 205 may be mounted within the input tray 110, and detects if hardcopy media 115 is placed on the input tray 110. The first media detector 205 can be of any form known to those skilled in the art including, but not limited to, contact sensors and optical sensors. The first media sensor 205 generates and outputs a first media detection signal which changes in signal value depending on whether or not media is placed on the input tray 110.

The first microphone 200a, second microphone 200b, and third microphone 200c are examples of sound detectors that detect the sound generated by the top hardcopy medium 117 during transport through the media transport path 290. The microphones generate and output analog signals representative of the detected sound. The microphones 200a and 200b are arranged to the left and right of the urging rollers 120, while fastened to the delta wing 185 at the front of the scanner pod 180. The microphones 200a and 200b are mounted so as to point down towards the input tray 110. To enable the sound generated by the top hardcopy medium 117 during transport of the media to be more accurately detected by the first microphone 200a and the second microphone 200b, a hole is provided in the delta wing 185 facing the input tray 110. The microphones 200a and 200b may be mounted to the delta wing 185 using a vibration reducing gasket. The third microphone 200c is at the downstream side of the feed roller 223 and the separator roller 220 while fastened to the upper media guide 292. A hole for the third microphone 200c is provided in the upper media guide 292 facing media transport path 290. The microphone 200c may be mounted in the upper media guide 292 using a vibration reducing gasket. As an example, the microphones may be MEMS microphones mounted flush to a baffle with isolator material to reduce vibration transferring from the baffle to the MEMS. By mounting the MEMS flush, the amount of internal machine noise behind the microphone that can be detected by the microphone is reduced.

The second media detector 210 is arranged at a downstream side of the feed roller 223 and the separator roller 220 and at an upstream side of the take-away rollers 260. The second media detector 210 detects if there is a hardcopy media present at that position. The second media detector 210 generates and outputs a second media detection signal which changes in signal value depending on whether hardcopy media is present at that position. The second media detector 210 can be of any form known to those skilled in the art including, but not limited to, contact sensors, motion sensor and optical sensors.

An induction sensor 215 is arranged near the near the entry of point of media from the input tray into the document transport path. In particular, the induction sensor 215 may be arranged at a downstream side of the feed roller 223 and the separator roller 220, and at an upstream side of the second media detector 210. The induction sensor 215 detects if there is any metallic material, including, but not limited to, paper clips or staples, attached to the hardcopy media. The induction sensor 215 generates and outputs a metal detection signal which changes in signal value depending on whether metallic material is present. The induction sensor 215 can be of any form known to those skilled in the art including, but not limited to, inductive sensors or proximity sensors.

An ultrasonic transmitter 282 and an ultrasonic receiver 284, together forming an ultrasonic sensor 280, are arranged near the media transport path 290 so as to face each other across the media transport path 290. The ultrasonic transmitter 282 transmits an ultrasonic wave that passes through the top hardcopy medium 117 and is detected by the ultrasonic receiver 284. The ultrasonic receiver then generates and outputs a signal, which may be an electrical or digital signal, corresponding to the detected ultrasonic wave.

A plurality of ultrasonic transmitters 282 and ultrasonic receivers 284 may be used. In this situation, the ultrasonic transmitters 282 are positioned across the lower media guide 294 perpendicular to the transport direction as marked by arrow A4 while ultrasonic receivers 284 are positioned across the upper media guide 292 perpendicular to the transport direction as marked by arrow A4.

A pod image acquisition unit 230 is included that has an image sensor, such as a CIS (contact image sensor) or CCD (charged coupled device). Similarly, a base image acquisition unit 234 is included that has an image sensor, such as a CIS or CCD.

As the top hardcopy medium 117 travels through the media transport path 290, it passes the pod imaging aperture 232 and the base imaging aperture 236. The pod imaging aperture 232 is a slot in the upper media guide 292 while the base imaging aperture 236 is a slot in the lower media guide 294. The pod image acquisition unit 230 images the top surface of the top hardcopy medium 117 as it passes the pod imaging aperture 232 and outputs an image signal. The base image acquisition unit 234 images the bottom surface of the top hardcopy medium 117 as it passes the base imaging aperture 236 and outputs an image signal. It is also possible to configure the pod image acquisition unit 230 and the base image acquisition unit 234 such that only one surface of the top hardcopy medium 117 is imaged.

The top hardcopy medium 117 is moved along a media transport path 290 by sets of rollers. The sets of rollers are composed of a drive roller and normal force roller. The drive roller is driven by a motor which provides the driving force to the roller. The normal force roller is a freewheeling roller that provides pressure to capture the top hardcopy medium 117 between the drive roller and normal force roller. In the medium transport system 10, the initial drive and normal force rollers that grab the top hardcopy medium 117 within the media transport path 290 are referred to as take-away rollers 260. The additional drive and normal force roller pairs along the media transport path 290 are referred to as transport rollers 265. The rollers may be driven by a single motor where all the rollers start and stop together. Alternatively the rollers may be grouped together where each group is driven by its own motor. This allows different motor groups to be started and stopped at different times or run at different speeds.

The medium transport system 10 may have an output transport roller 140. The output transport roller 140 is connected to a separate drive motor that either speeds-up the top hardcopy medium 117 or slows down the top hardcopy medium 117 for modifying the way the output hardcopy media 150 is placed into the output tray 190, as described in detail in U.S. Pat. No. 7,828,279, incorporated herein by reference.

Hardcopy media 115 placed on the input tray 110 is transported between the lower media guide 294 and the upper media guide 292 in the transport direction shown by arrow A4 by rotation of the urging roller 120. The urging roller 120 pulls the top hardcopy medium 117 out of the input tray 110 and pushes it into the feed roller 223. The separator roller 220 resists the rotation of the feed roller 223, such that when the input tray 110 has a plurality of hardcopy media 115 placed on it, only the top hardcopy medium 117 which is in contact with the feed roller 223 is selected for feeding into the media transport path 290. The transport of the hardcopy media 115 below the top hardcopy medium 117 is restricted by the separator roller 220 to prevent feeding more than one medium at a time, which is referred to as a multi-feed.

The top hardcopy medium 117 is fed between the take-away rollers 260 and is transported through the transport rollers 265 while being guided by the lower media guide 294 and the upper guide 292. The top hardcopy medium 117 is sent past the pod image acquisition unit 230 and the base image acquisition unit 234 for imaging. The top hardcopy medium 117 is then ejected into the output tray 190 by the output transport roller 140. In addition to microphones 200a, 200b, and 200c, a microphone 297 may be provided near the exit of the transport path. This microphone 297 detects the sounds of the hardcopy media towards the end of the transport path, and as the media is output into the output tray. These detected sounds may be used to detect jams occurring in the output tray or as documents are exiting the media transport device. A system processing unit 270 monitors the state of the medium transport system 10 and controls the operation of the medium transport system 10 as described in more detail below.

Although FIG. 2 shows the urging roller 120 above the stack of hardcopy media 115 to select the top hardcopy media 117, in a feeding configuration often referred to as a top feeding mechanism, other configurations may be used. For example, the urging roller 120, feed roller 223 and separator roller 220 can be inverted such that the urging roller selects the hardcopy media at the bottom of the hardcopy media stack 115. In this configuration, microphone 200a and 200b may be moved into the scanner base 100.

In addition, a hardcopy media preparing station may be provided that allows an operator to check hardcopy media for metallic objects before conveying the hardcopy media into the medium transport system. The hardcopy media preparing system may be part of the input tray, or could be a separate preparation area. The hardcopy media preparation station may include one or more induction sensors located within a tray on the preparation station or within a sensing arm. When located in a sensing arm, the operator may move the sensing arm around media on the preparation station, with the induction sensors in the arm providing signals to generate an alert when a metallic object within the media is found. Once metallic objects have been detected and located, they can be removed manually by the operator or through an automated process.

Figure 3:
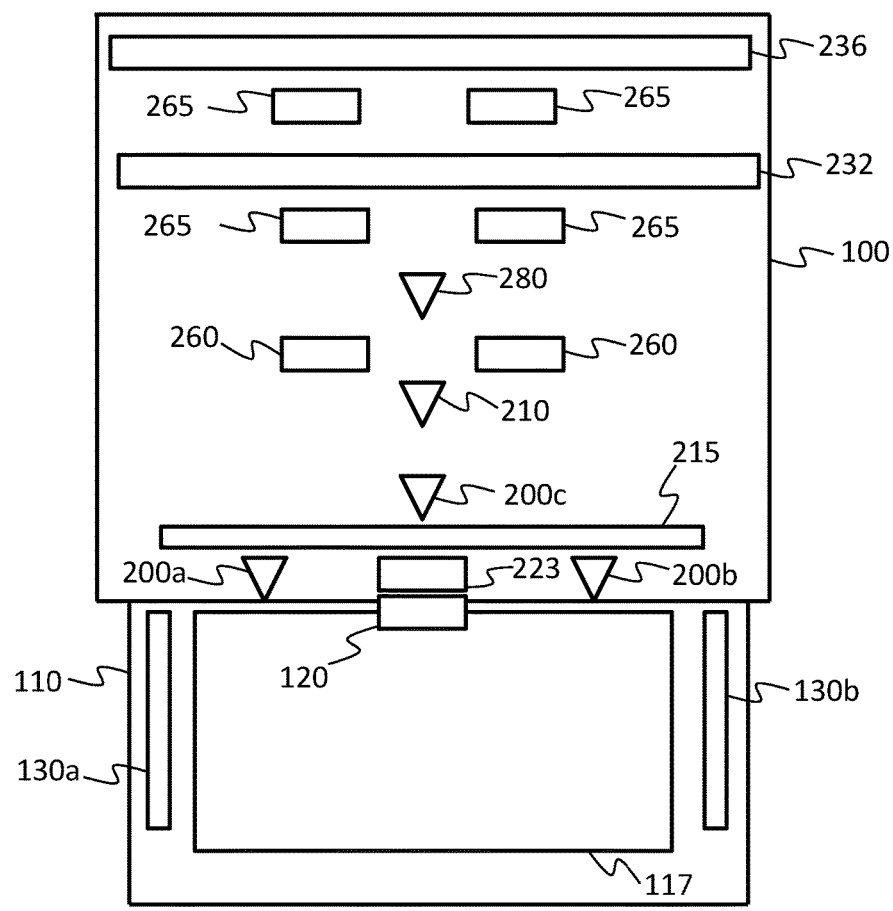
FIG. 3 is a high-level diagram showing a flattened view of the components of a medium transport system.

FIG. 3 is a block diagram of the medium transport system 10 as seen from the viewpoint shown by the direction arrow A5 in FIG. 2. As shown in FIG. 3, the first microphone 200a is provided to the left of the urging roller 120 and feed rollers 223 along the delta wing 185. The second microphone 200b is provided to the right of the urging roller 120 and feed rollers 223 along the delta wing. The placement of microphones 200a and 200b capture sound from the top hardcopy medium 117 as it is being urged into the feed roller 223 by the urging roller 120. The third microphone 200c is preferably located slightly behind and downstream of the feed rollers 223. The placement of microphone 200c captures sound from the top hardcopy medium 117 as it passes the feed roller 223 and before reaching the take-away rollers 260. The induction sensor 215 may be mounted in the lower transport guide 294 at the entrance of the media transport path 290 to detect metallic objects as early as possible. One more induction sensors 215 may also be included at various other positions along the transport path. Since there are various metal components within the scanner base 100 and scanner pod 180, the area of detection of the induction sensor 215 is selected to be small to avoid picking up the metal components. Thus, the induction sensor 215 may be placed along the back side of the separator roller 220 where the top hardcopy media 117 position is controlled by the feed roller 223 and separator roll 220 such that hardcopy media 117 is within the field of the induction sensor 215.

Figure 4:
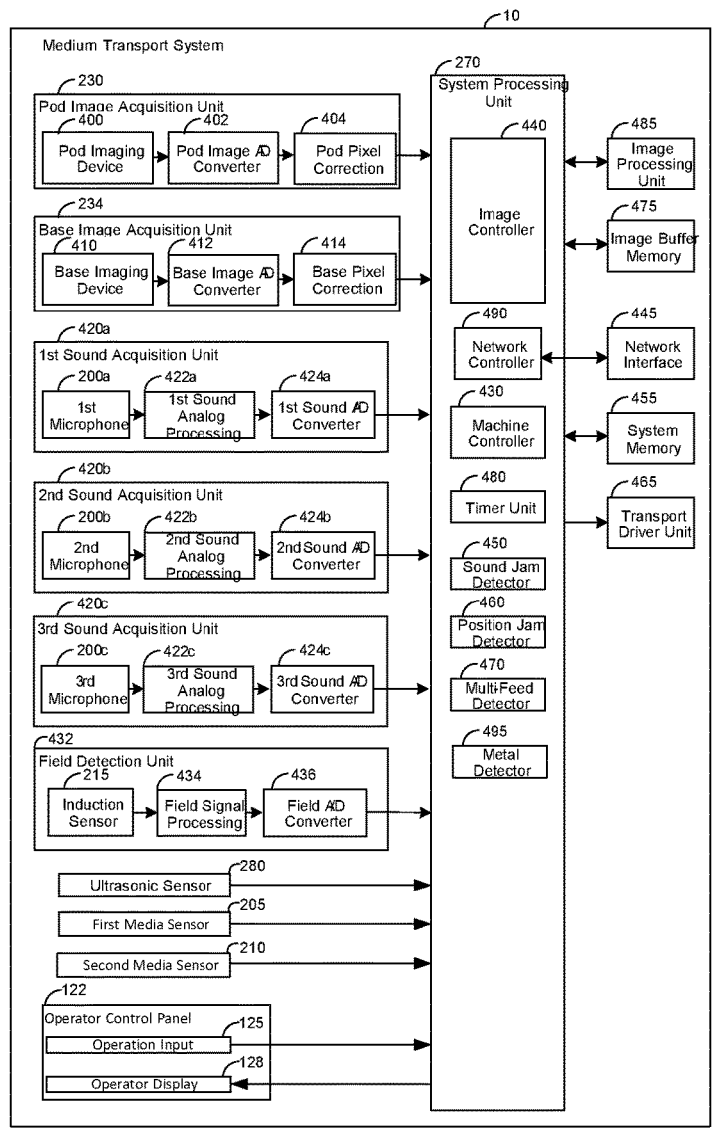
FIG. 4 is an example of a block diagram which shows the general configuration of a medium transport system.

FIG. 4 is a block diagram which shows the schematic illustration of a medium transport system 10. The pod image acquisition unit 230 is further composed of a pod image device 400, pod image A/D converter 402 and pod pixel correction 404. As noted above, the pod image device 400 has a CIS (contact image sensor) of an equal magnification optical system type which is provided with an image capture element using CMOS (complementary metal oxide semiconductors) which are arranged in a line in the main scan direction. As noted above, instead of a CIS, it is also possible to utilize an image capturing sensor of a reduced magnification optical system type using CCD's (charge coupled devices). The pod imaging A/D converter 402 converts an analog image signal which is output from the pod image device 400 to generate digital image data which is then output to the pod pixel correction 404. The pod pixel correction 404 corrects for any pixel or magnification abnormalities. The pod pixel correction 404 outputs the digital image data to the image controller 440 within the system processing unit 270. The base image acquisition unit 234 is further composed of a base image device 410, base image A/D converter 412 and base pixel correction 414. The base image device 410 has a CIS (contact image sensor) of an equal magnification optical system type which is provided with an image capture element using CMOS's (complementary metal oxide semiconductors) which are arranged in a line in the main scan direction. As noted above, instead of a CIS, it is also possible to utilize an image capturing sensor of a reduced magnification optical system type using CCD's (charge coupled devices). The base imaging A/D converter 412 converts an analog image signal which is output from the base image device 410 to generate digital image data which is then output to the base pixel correction 414. The base pixel correction 414 corrects for any pixel or magnification abnormalities. The base pixel correction 414 outputs the digital image data to the image controller 440 within the system processing unit 270. Digital image data from the pod image acquisition unit 230 and the base image acquisition unit 234 will be referred to as captured images.

The operator configures the image controller 440 to perform the required image processing on the captured images either through the operator control panel 122 or network interface 445. As the image controller 440 receives the captured images, it sends the captured images to the image processing unit 485 along with a job specification that defines the image processing that should be performed on the captured images. The image processing unit 485 performs the requested image processing on the captured images and outputs processed images. The functions of image processing unit 485 can be provided using a single programmable processor or by using multiple programmable processors, including one or more digital signal processor (DSP) devices. Alternatively, the image processing unit 485 can be provided by custom circuitry (e.g., by one or more custom integrated circuits (ICs) designed specifically for use in digital document scanners), or by a combination of programmable processor(s) and custom circuits.

The image controller 440 manages image buffer memory 475 to hold the processed images until the network controller 490 is ready to send the processed images to the network interface 445. The image buffer memory 475 can be internal or external memory of any form known to those skilled in the art including, but not limited to, SRAM, DRAM, or Flash memory. The network interface 445 can be of any form known to those skilled in the art including, but not limited to, Ethernet, USB, Wi-Fi or other data network interface circuit. The network interface 445 connects the medium transport system 10 with a computer or network (not shown) to send and receive the captured image. The network interface 445 also provides a means to remotely control the medium transport system 10 by supplying various types of information required for operation of the medium transport system 10. The network controller 490 manages the network interface 445 and directs network communications to either the image controller 440 or a machine controller 430.

A first sound acquisition unit 420*a* includes the first microphone 200*a*, a first sound analog processing 422*a*, and a first sound A/D Converter 424*a*, and generates a sound signal responsive to the sound picked up by the first microphone 200*a*. The first sound analog processing 422*a* filters the signal which is output from the first microphone 200*a* by passing the signal through a low-pass or band-pass filter to select the frequency band of the interest. The first sound analog processing 422*a* also amplifies the signal and outputs it to the first sound A/D converter 424*a*. The first sound A/D converter 424*a* converts the analog signal which is output from the first sound analog processing 422*a* to a digital first source signal and outputs it to the system processing unit 270. As described herein, outputs of the first sound acquisition unit 420*a* are referred to as the "left sound signal." The first sound acquisition unit 420*a* may comprise discrete devices or may be integrated into a single device such as a digital output MEMS microphone.

A second sound acquisition unit 420*b* includes the second microphone 200*b*, a second sound analog processing 422*b*, and a second sound A/D Converter 424*b*, and generates a sound signal responsive to the sound picked up by the second microphone 200*b*. The second sound analog processing 422*b* filters the signal which is output from the second microphone 200*b* by a passing the signal through a low-pass or band-pass filter to select the frequency band of the interest. The second sound analog processing 422*b* also amplifies the signal and outputs it to the second sound A/D converter 424*b*. The second sound A/D converter 424*b* converts the analog signal which is output from the second sound analog processing 422*b* to a digital second source signal and outputs it to the system processing unit 270. As described herein, outputs of the second sound acquisition unit 420*b* outputs will be referred to as the "right sound signal." The second sound acquisition unit 420*b* may comprise discrete devices or may be integrated into a single device such as a digital output MEMS microphone.

A third sound acquisition unit 420*c* includes the third microphone 200*c*, a third sound analog processing 422*c*, and a third sound A/D Converter 424*c*, and generates a sound signal responsive to the sound picked up by the third microphone 200*c*. The third sound analog processing 422*c* filters the signal which is output from the third microphone 200*c* by a passing the signal through a low-pass or band-pass filter to select the frequency band of the interest. The third sound analog processing 422*c* also amplifies the signal and outputs it to the third sound A/D converter 424*c*. The third sound A/D converter 424*c* converts the analog signal which is output from the third sound analog processing 422*c* to a digital third source signal and outputs it to the system processing unit 270. As described herein, outputs of the third sound acquisition unit 420*c* outputs will be referred to as the "center sound signal." The third sound acquisition unit 420*c* may comprise discrete devices or may be integrated into a single device such as a digital output MEMS microphone.

Below, the first sound acquisition unit 420*a*, second sound acquisition unit 420*b* and the third sound acquisition unit 420*c* may be referred to overall as the sound acquisition unit 420.

A field detection unit 432 includes the induction sensor 215, field signal processing 434, and a field A/D Converter 436, and generates a signal responsive to the electromagnetic field picked up by the induction sensor 215. The field signal processing 434 filters and removes noise from the signal which is output from the induction sensor 215 by passing the signal through a filter to shape or smooth the signal. The field signal processing 434 also amplifies the signal and outputs it to the field A/D Converter 436. The field A/D Converter 436 converts the analog signal which is output from the field signal processing 434 to a digital metallic detection signal and outputs it to the system processing unit 270. The field detection unit 432 may comprise discrete devices or may be integrated into a single device such as a digital output module or ASIC device.

The transport driver unit 465 includes one or more motors and control logic required to enable the motors to rotate the urging roller 120, the feed roller 223, the take-away rollers 260, and the transport rollers 265 to transport the top hardcopy medium 117 through the media transport path 290.

The system memory 455 has a RAM (random access memory), ROM (read only memory), or other memory device, a hard disk or other fixed disk device, or flexible disk, optical disk, or other portable storage device. Further, the system memory 455 stores a computer program, database, and tables, which are used in various control functions of the medium transport system 10. Furthermore, the system memory 455 may also be used to store the captured images or processed images.

The system processing unit 270 is provided with a CPU (central processing unit) and operates based on a program which is stored in the system memory 455. The system processing unit 270 may be a single programmable processor or may be comprised of multiple programmable processors, a DSP (digital signal processor), LSI (large scale integrated circuit), ASIC (application specific integrated circuit), and/or FPGA (field-programming gate array). The system processing unit 270 is connected to the operation input 125, the operator display 128, first media sensor 205, second media sensor 210, ultrasonic sensor 280, pod image acquisition unit 230, base image acquisition unit 234, first sound acquisition unit 420a, second sound acquisition unit 420b, third sound acquisition unit 420c, image processing unit 485, image buffer memory 475, network interface 445, system memory 455, transport driver unit 465.

The system processing unit 270 further controls the transport driver unit 465, and the pod image acquisition unit 230 and base image acquisition unit 234 to acquire captured images. Further, the system processing unit 270 has a machine controller 430, an image controller 440, a sound jam detector 450, a position jam detector 460, a metal detector 495, and a multi-feed detector 470. These units are functional modules which are realized by software operating on a processor. These units may also be implemented on independent integrated circuits, a microprocessor, DSP or FPGA.

The sound jam detector 450 executes the sound jam detection processing. In the sound jam detection processing, the sound jam detector 450 determines whether a jam has occurred based on a first sound signal acquired from the first sound acquisition unit 420a, a second sound signal acquired from the second sound acquisition unit 420b and/or a third sound signal acquired from the third sound acquisition unit 420c. Situations in which the sound jam detector 450 determines that a media jam has occurred based on each signal, or a combination of signals, may be referred to as a sound jam.

The position jam detector 460 executes the position jam detection processing. The position jam detector 460 uses second media detection signals acquired from the second media sensor 210, an ultrasonic detection signal acquired from the ultrasonic detector 280, and a timer unit 480, started when the transport driver unit 465 enables the urging rollers 120 and the feed rollers 223 to feed the top hardcopy medium 117, to determine whether a jam has occurred. The position jam detector 460 can also use pod image acquisition unit 230 and base image acquisition unit 234 to detect the lead-edge and trail-edge of the top hardcopy media 117. In this case, the image controller 440 outputs a lead-edge and trail-edge detection signal which is combined with the timer unit 480 to determine that a jam has occurred if the lead-edge and trail-edge detection signal are not obtained within a predefined amount of time. Situations in which the position jam detector 460 determines that a media jam has occurred based on the second media detection signal, the ultrasonic detection signal, pod image acquisition unit 230 or base image acquisition unit 234 may be referred to as a position jam.

The multi-feed detector 470 executes multi-feed detection processing. In the multi-feed detection processing, the multi-feed detector 470 determines whether the feed module 225 has allowed multiple hardcopy media to enter the media transport path 290 based on an ultrasound signal acquired from the ultrasonic detector 280. Situations in which the multi-feed detector 470 determines that multiple hardcopy media entered the media transport path 290 may be referred to as a multi-feed.

The metal detector 495 executes the metallic detection processing. The metal detector 495 uses metallic detection signals acquired from the field detection unit 432, to determine whether the hardcopy media contains metallic material. Situations in which the metal detector 495 determines that the hardcopy media entered the media transport path 290 contains metallic material may be referred to as a metal detect exception.

The machine controller 430 determines whether an abnormality condition, such as a medium jam, has occurred along a media transport path 290. The machine controller 430 determines that an abnormality has occurred when there is at least one of a sound jam, a position jam, metal detect exception, and/or a multi-feed condition. When an abnormality is detected, the machine controller 430 takes action based on the operators predefined configuration for abnormality conditions. One example of a predefined configuration would be for the machine controller 430 to inform the transport driver unit 465 to disable the motors. At the same time, the machine controller 430 notifies the user of media jam using the operator control panel 122. Alternatively, the machine controller may display an abnormality condition on the operator display 128 or issue an abnormality condition notice over the network interface, allowing the operator to manually take action to resolve the condition.

When a medium jam along a media transport path 290 has not occurred, the image controller 440 causes the pod imaging acquisition unit 230 and the base imaging acquisition unit 234 to image the top hardcopy medium 117 to acquire a captured image. The pod imaging acquisition unit 230 images the top hardcopy medium 117 via the pod image device 400, pod image A/D Converter 402, and pod pixel correction 404 while the base imaging acquisition unit 234 images the top hardcopy medium 117 via the base image device 410, base image A/D converter 412, and base pixel correction 414.

Figure 5A:
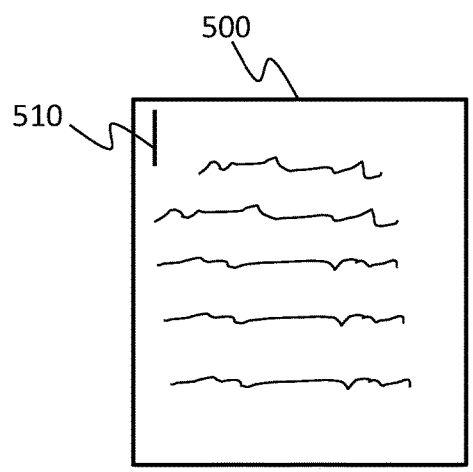
FIGS. 5A-C are illustrations showing different examples of metal attached to hardcopy media.
Figure 5B:
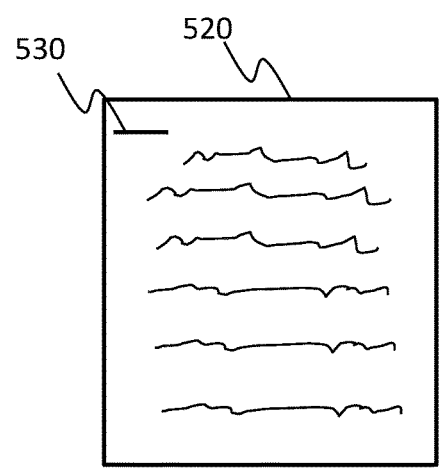
Figure 5C:
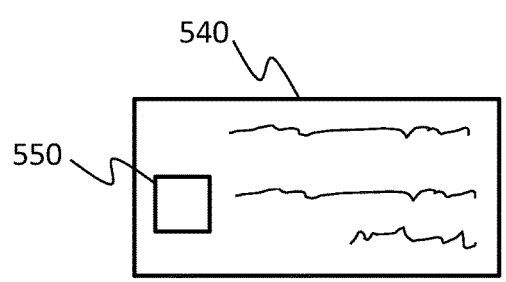

FIG. 5A, FIG. 5B and FIG. 5C are views illustrating various metallic objects attached to a hardcopy medium. In FIG. 5A, hardcopy medium 500 contains staple 510 that is attached vertically to the hardcopy medium 500. FIG. 5B illustrates a hardcopy medium 520 that contains staple 530 attached horizontally to the hardcopy medium 520. The width of the staple is defined as the distance between the two legs that punch through the hardcopy medium and is sometimes referred to as the crown. The gauge of the staple is referred as the diameter of the metal the staple is made from. FIG. 5C illustrates a hardcopy medium 540 with metallic foil 550 attached to it. The edge that is parallel to the lead-edge of the hardcopy medium is referred to as the width of the foil, while the edge that is perpendicular to the lead-edge is referred to as the height.

Figure 6A:
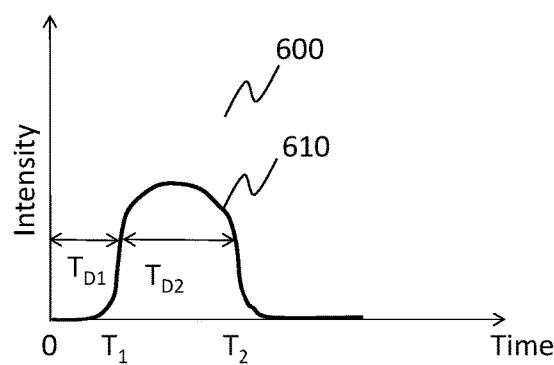
FIGS. 6A-C are examples of the waveforms produced from examples in FIGS. 5A-C.
Figure 6B:
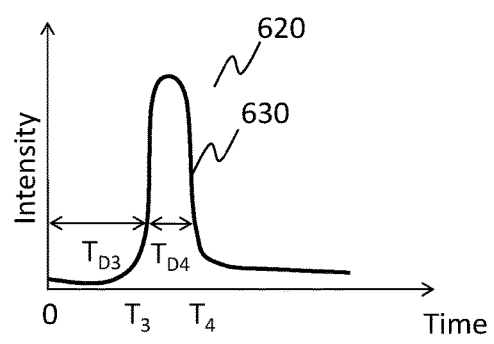
Figure 6C:
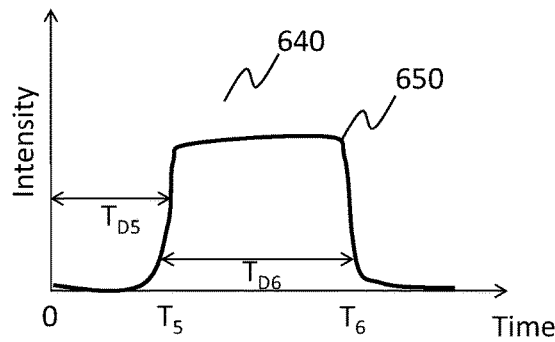

FIG. 6A, FIG. 6B and FIG. 6C illustrate example waveforms from the field detection unit 432 acquired from hardcopy media containing various metallic objects as shown in FIG. 5A-C. The graph 600, which is shown in FIG. 6A, illustrates the output waveform 610 from the field detection unit 432 when hardcopy medium 500 is transported past the induction sensor 215. In this configuration, staple 510 is positioned parallel to the transport direction as indicted by arrow A4. At time T1, the disturbance in the magnetic field caused by staple 510 has been detected and the output of the field detection unit 432 changes state indicating the presence of a metallic object. At time T2, the staple 510 passes through the magnetic field and the output of the field detection unit 432 changes its state back it normal state. Time 0 corresponds to the machine controller 430 activating the transport driver unit 465 to activate the urging roller 120 to pull the top hardcopy medium 117 towards the feed roller 223 and the separator roller 220. Timer unit 480 can be used to determine time delay TD1, which represents the time from activating the transport driver unit 465 to the change in the output of the field detection unit 432 indicating the presence of a metallic object. In addition, Timer unit 480 can be used to determine the duration the metal object is within the field, as represented in FIG. 6A as TD2. Since the staple 510 is positioned parallel to the transport direction as indicted by arrow A4, the width of staple 510 is represented by the duration of TD2.

The time delays can be converted to distances using the speed the transport driver unit 465 drives the motors by the formula shown below.

distance=TimeDelay*TransportSpeed

Using the speed the transport driver unit 465 drives the motors, the location of the staple from the lead-edge of the hardcopy medium can be calculated from TD1, and the physical width of the staple can be calculated from TD2. The thickness or diameter of the staple 510 will be related to the intensity.

The graph 620, which is shown in FIG. 6B, illustrates the output waveform 630 from the field detection unit 432 when hardcopy medium 520 is transported past the induction sensor 215. In this configuration, staple 530 is positioned perpendicular to the transport direction as indicted by arrow A4. At time T3, the disturbance in the magnetic field caused by staple 530 has been detected and the output of the field detection unit 432 changes state indicating the presence of a metallic object. At time T4, the staple 530 passes through the magnetic field and the output of the field detection unit 432 changes its state back it normal state. Time 0 corresponds to the machine controller 430 activating the transport driver unit 465 to activate the urging roller 120 to pull the top hardcopy medium 117 towards the feed roller 223 and the separator roller 220. Timer unit 480 can be used to determine time delay TD3, which represents the time from activating the transport driver unit 465 to the change in the output of the field detection unit 432 indicating the presence of a metallic object. In addition, Timer unit 480 can be used to determine the duration the metal object is within the field as represented in FIG. 6B as TD4. Since the staple 530 was positioned perpendicular to the transport direction as indicted by arrow A4, the pulse width TD4 is much narrower than the width TD2. Based on the narrow pulse we know the object passed through the field quickly. The width of the staple 530 is related to the intensity. In this case the staple 530 was perpendicular to the transport direction so the full width of the staple was in the field at the same time. The wider staple 530 is, the larger the intensity. Using the speed the transport driver unit 465 drives the motors, the location of the staple from the lead-edge is calculated from TD3 using the formula below, and the thickness or diameter of the staple 530 will be related to the intensity.

The graph 640, which is shown in FIG. 6C, illustrates the output waveform 650 from the field detection unit 432 when hardcopy medium 540 is transported past the induction sensor 215. In this configuration, hardcopy medium 540 contains metallic foil 550. At time T5, the disturbance in the magnetic field caused by metallic foil 550 has been detected and the output of the field detection unit 432 changes state indicating the presence of a metallic object. At time T6, the metallic foil 550 passes through the magnetic field and the output of the field detection unit 432 changes its state back it normal state. Since the metallic foil 550 is a uniform size and consistency, the lead-edge and trail-edge will produce similar levels of intensity at the output of the field detection unit 432. Time 0 corresponds to the machine controller 430 activating the transport driver unit 465 to activate the urging roller 120 to pull the top hardcopy medium 117 towards the feed roller 223 and the separator roller 220.

Timer unit 480 is used to determine time delay TD5, which represents the time from activating the transport driver unit 465 to the change in state of the output of the field detection unit 432 indicating the presence of a metallic object. In addition, Timer unit 480 is used to determine the duration the metallic foil 550 was within the field, as represented in FIG. 6C as TD6. The length of metallic foil 550 is represented by the duration of TD6. Using the speed the transport driver unit 465 drives the motors, the location of the metallic foil 550 is calculated from TD5, and the physical length of the metallic foil 550 is calculated from TD6. The width of the metallic foil 550 is related to the intensity. The larger the intensity, the wider the metallic foil.

As seen in FIG. 6A, the longer the metallic object stays with the field, the longer the field will be disrupted. Waveform 620 illustrates the metallic object passing through the field quickly as represented by a narrow pulse, but the intensity of disruption to the field is considerably more than waveform 600. The intensity of the field disruption is directly related to the amount of the metal object under the induction sensor 215, while the duration of the field disruption is directly related to the amount of time the metal object stays in the field.

Figure 7:
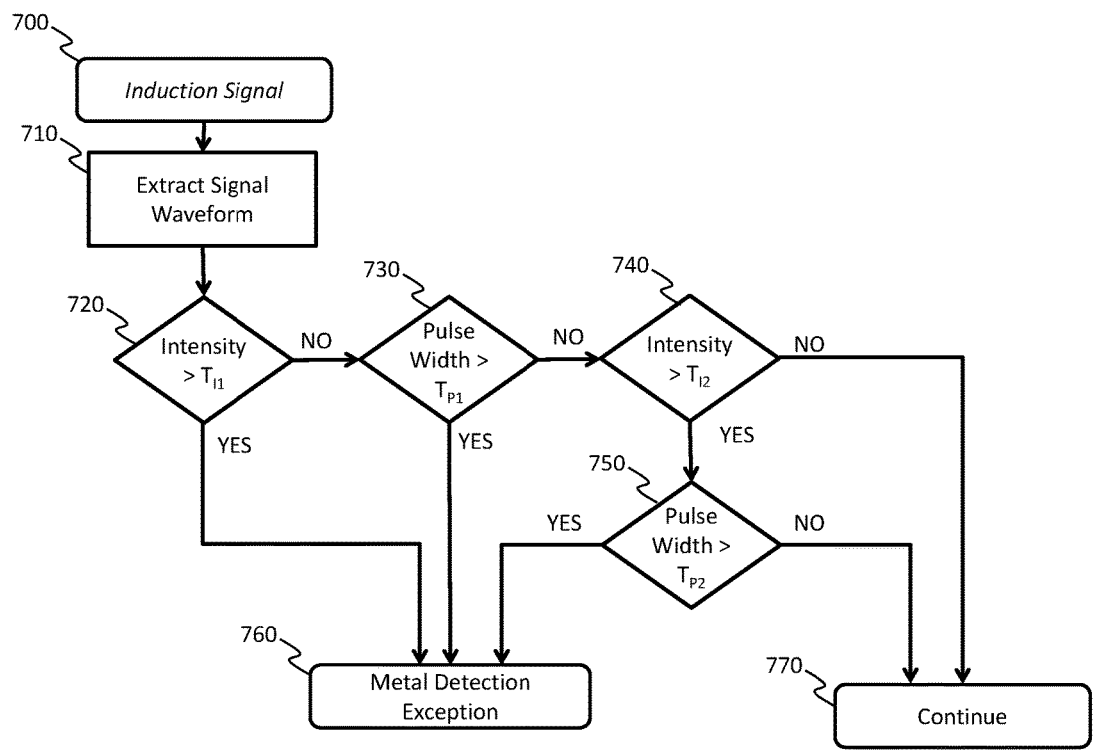
FIG. 7 is a diagram illustrating a process for detecting metallic objects.

FIG. 7 is an example of a flowchart of the process used to determine the presence of metallic objects in the hardcopy media. The induction signal 700 from induction 215 is processed in block 710, where the waveform for the induction signal 700 is extracted. Blocks 720, 730, 740 and 750 test the extracted waveform to determine if a metallic object is present.

Block 720 compares the maximum intensity of the detected waveforms to an intensity threshold $T_{I1}$. If the maximum intensity is greater than the intensity threshold $T_{I1}$, then processing continues to Block 760 where a metal detection exception is indicated. If the maximum intensity is not greater than the intensity threshold $T_{I1}$, then the testing moves to block 730 which compares the maximum pulse width to a pulse width threshold $T_{P1}$.

Block 730 compares the maximum pulse width to the pulse width $T_{P1}$. If the maximum pulse width is greater than the pulse width threshold $T_{P1}$, then processing continues to Block 760 where a metal detection exception is indicated. If the maximum pulse width is not greater than the pulse width threshold $T_{P1}$, then the testing moves to block 740 which compares the maximum intensity to the intensity threshold $T_{P2}$.

Block 740 compares the maximum intensity to an intensity threshold $T_{I2}$. If the maximum intensity is less than the intensity threshold $T_{I2}$, then processing moves to block 770 to continue. If the maximum intensity is greater than the intensity threshold $T_{I2}$, then processing continues to Block 750, where block 750 compares the maximum pulse width to a pulse width threshold $T_{P2}$. If the maximum pulse width is greater than the pulse width threshold $T_{P2}$, then processing continues to Block 760 where a metal detection exception is indicated. If the maximum pulse width is not greater than the pulse width threshold $T_{P2}$, then process moves to block 770 to continue.

Figure 8:
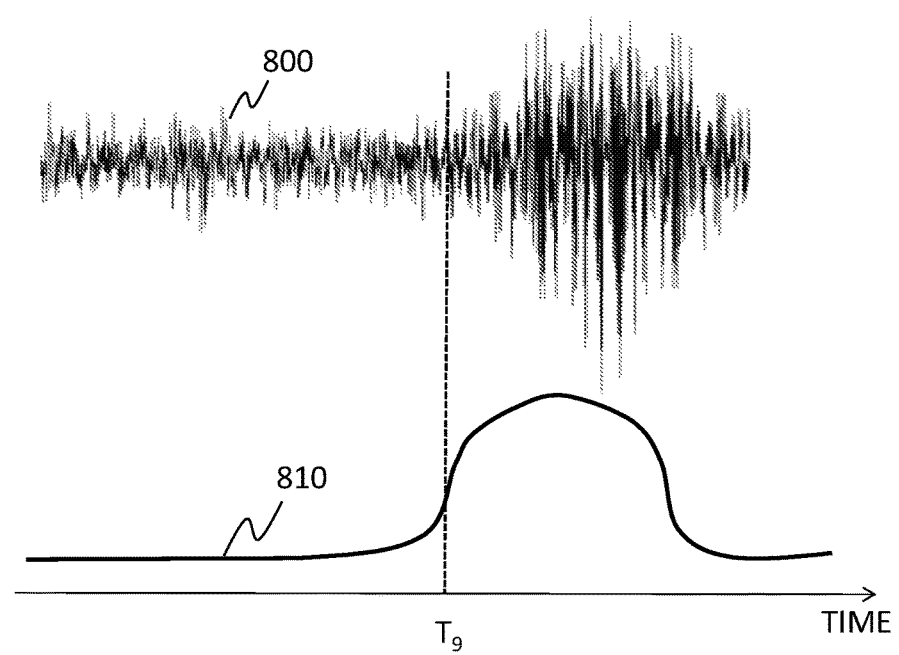
FIG. 8 is an illustration showing the relationship between sound profile and metallic detection.

FIG. 8 shows the relationship between an audio profile 800 captured at one of the microphones and the induction signal 810 captured by the induction sensor 215. By combining the induction signal 810 with the audio signal 800 captured at one or more of microphones 200*a*, 200*b* and 200*c*, false jams resulting from hardcopy media with embedded metallic material can be avoided. Since most hardcopy media jams are the result of multiple hardcopy media attached with a staple or paper clip, lower loudness threshold can be used in the sound jam detection processing executed by the sound jam detector 450 when the audio profile 800 is combined with the induction signal 810 output from the field detection unit 432. Since the induction sensor 215 is mounted at upstream of microphone 200*c*, it will start to detect metallic objects before the top hardcopy media starts to wrinkle when it is attached to the hardcopy media below it. If the metal detector indicates that a metal object is present, but the audio processing does not detect a jam, the medium may be allowed to continue along the transport path.

At time T9 in FIG. 8 the induction signal 810 starts to change state in response the detection of a metallic object by the induction sensor 215. At T9 the sound jam detection processing switches to lower thresholds to allow sound jam detection processing to detect hardcopy media jam with a lower maximum loudness. As noted above, lower thresholds may be necessary as multiple sheets of media transported through the device may generate lower sound profiles as compared to single sheets. Thus, when multiple sheets are attached with a staple, paper clip, or other metallic object, the sound thresholds can automatically be adjusted in response to the signal from the induction sensor to account for this.

If sound jam detection processing detects a sound jam when metallic detection processing detects the presence of a metallic object, then abnormality condition is issued. On the other hand, if the sound jam detection processing does not detect a sound jam when metallic detection processing detects the presence of a metallic object, then the top hardcopy media 117 might have an embedded magnetic strip or label. By combining the metallic detection processing with sound jam detection processing, false abnormality conditions can be avoided.

Alternatively, the induction signal 810 could be combined with the ultrasonic detection signal acquired from the ultrasonic detector 280. Since most hardcopy media multi-feeds are the result of multiple hardcopy media attached with a staple or paper clip, the thresholds used in multi-feed detection processing executed by the multi-feed detector 470 can be adjusted so as to change the sensitivity of multi-feed detection. Different sensitivities may be necessary for multi-feed detection processing, as multiple sheets of media transported past ultrasonic detector 280 may generate different ultrasonic detection signal profiles as compared to single sheets. Thus, when multiple sheets are attached with a staple, paper clip, or other metallic object, the multi-feed sensitivity can automatically be adjusted in response to the signal from the induction sensor to account for this.

Since the induction sensor 215 is mounted upstream of the ultrasonic detector 280, the induction sensor 215 will start to detect metallic objects before the top hardcopy media reaches the ultrasonic detector 280. By combining the induction signal 810 with the output of the ultrasonic detector 280, missed multi-feeds can be reduced by changing the sensitivity of multi-feed detection. In addition, if the metal detector indicates that a metal object is present, but the multi-feed detection processing does not detect a multi-feed, then the top hardcopy media 117 might have an embedded magnetic strip or label, and the medium may be allowed to continue along the transport path. If the metal detector does not indicate that a metal object is present, but the multi-feed detection processing does detect a multi-feed, then the top hardcopy media 117 might have a non-magnetic strip or label, and the medium may be allowed to continue along the transport path. In both cases false multi-feeds can be reduced by combining the induction signal 810 with the output of the ultrasonic detector 280. In addition, the signal from the induction sensor, microphone sensors, and ultrasonic detector may all be combined in the processing.

Figure 9:
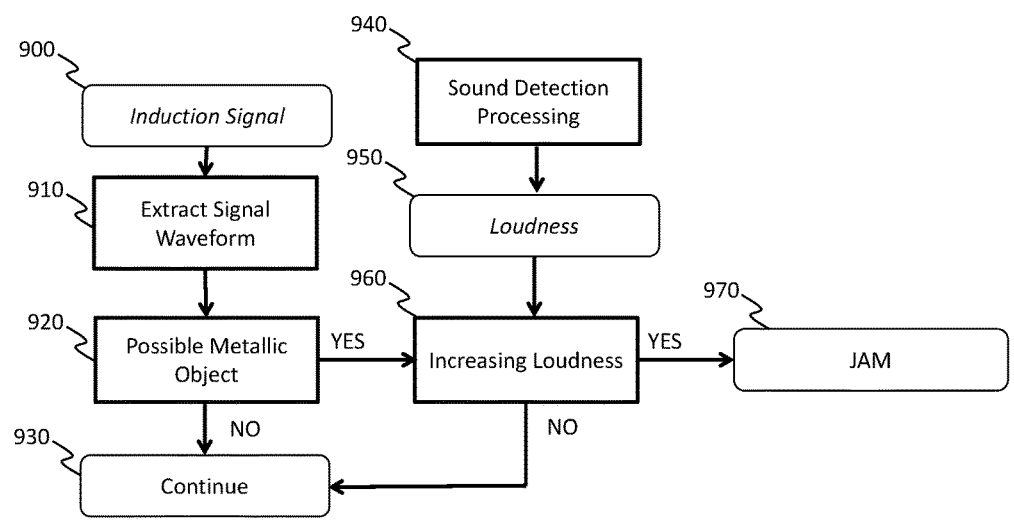
FIG. 9 is a diagram illustrating a processing for detecting sound jams combined with metal detection processing output.

FIG. 9 is flowchart illustrating additional processing that may be performed. Block 940 performs the sound detecting processing on the audio output from the sound acquisition unit 420 to produce a loudness 950 for signals from microphones 200*a*, 200*b* and 200*c*. Concurrently, an induction signal 900 from the induction sensor 215 is processed in block 910, where the waveform of the induction signal 900 is extracted. Block 920 tests the extracted waveform to determine if a metallic object is present. If the extract waveform from block 910 exceeds a predefined intensity threshold or duration threshold, then a YES condition is produced and processing moves to block 960 where the loudness 950 at microphones 200*a*, 200*b* and 200*c* can be checked. Block 960 tracks the loudness 950 over time to determine if the overall loudness is increasing or decreasing. If the overall loudness 950 is increasing, then the waveform extracted from 910 represents a hardcopy media with metal attached to it and processing moves to block 970 where a jam is issued. If the overall loudness 950 is not increasing then the waveform extracted from 910 may represent foil that is embedded into a hardcopy media and processing continues with block 930. Hardcopy media with metallic material, such as foil, can be of any form including, but not limited to, checks, credit or debit cards, smartcards, or other hardcopy media were data is embedded in magnetic strip or integrated circuit.

Figure 10:
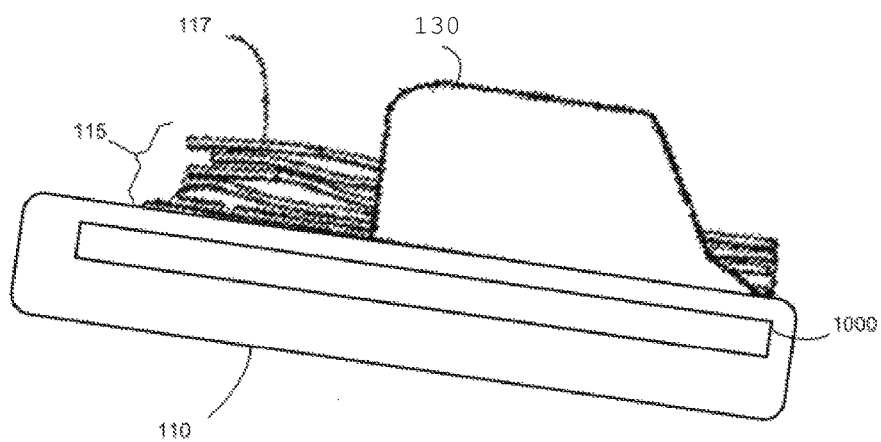
FIG. 10 is a diagram illustrating an alternative location of metallic detector.

FIG. 10 shows the system with an induction sensor being mounted in the input tray. As seen in FIG. 10, the induction sensor 1000 may be mounted in the input tray 110. By mounting the induction sensor 1000 in the input tray 110, a larger induction sensor 1000 and field can be used to check all the hardcopy media 115 in the input tray 110 at once. The operator may be notified that that a problem exists with the hardcopy media 115 in the input tray 110 by displaying a message in the operator display 128 on the operator control panel 122. This allows the operator to take action before the documents are transported into the device, thus avoiding jams and potential damage the hardcopy media or media transport device itself. This induction sensor in the input tray may be used in addition to the induction sensor mounted within the media transport system, as described above, or may be used instead of the induction sensor mounted within the media transport system.

Figure 11:
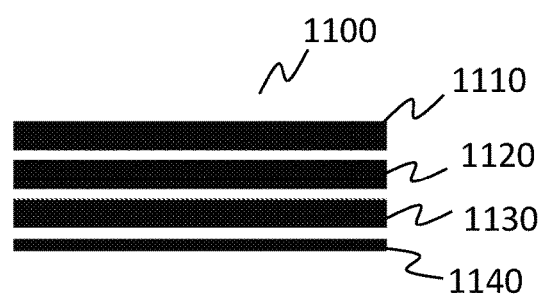
FIG. 11 is a diagram illustrating a metallic patch code and corresponding waveform.

As shown in FIG. 11, barcodes present on hardcopy media can be detected. Metallic material is used to create barcode 1100 in any form, including, but not limited to, foil or metallic ink. In barcode 1100, the thick black lines 1110, 1120 and 1130 are created from thick metallic material spaced apart with nonmetallic gaps. Thin line 1140 is created using a thin metallic material. The barcode may include unified spacing between the thick lines 1110, 1120 and 1130 and thin line 1140. Other barcode patterns may also be used, including codes with varying thicknesses or spacing between lines.

Figure 12:
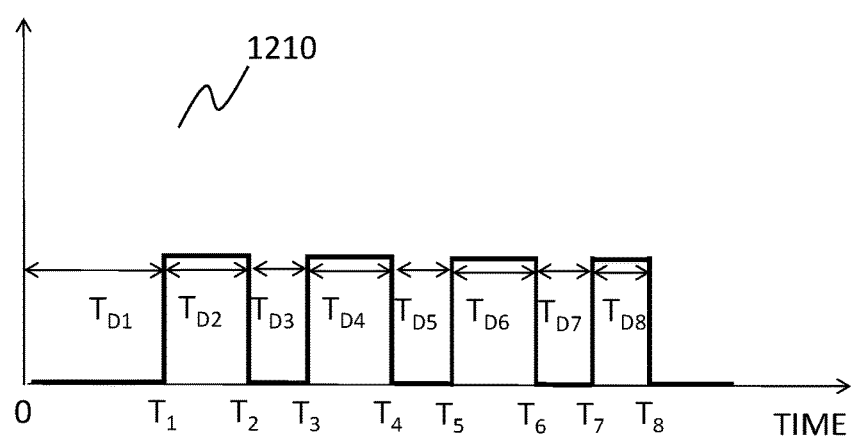
FIG. 12 is an example of the waveforms produced from examples in FIG. 11.

FIG. 12 shows the output of the field detection unit 432 represented as a binary signal waveform 1210 when a barcode, such as that shown in FIG. 11 is present. This waveform 1210 is used by the metallic detection processing for barcode detection. At time T1, the start of line 1110 is detected. At time T2 the end of line 1110 is detected. At time T3, the start of line 1120 is detected. At time T4 the end of line 1120 is detected. At time T5, the start of line 1130 is detected. At time T6 the end of line 1130 is detected. At time T7, the start of line 1140 is detected. At time T8 the end of line 1140 is detected. Timer unit determines time delay TD1, which represents the time from activating the transport driver unit 465 to the change in state of the output of the field detection unit 432 indicating the presence of a metallic object. In addition, Timer unit 480 is used to determine the thickness of the metal object barcode lines where TD2, TD4, TD6 and TD8 represent the thickness of the black lines 1110, 1120, 1130 and 1140. The spacing between the lines is represented by TD3, TD5 and TD7. Having the ability to detect barcodes generates many different options for what can be done with the hardcopy media. The barcode could tell the system processing unit 270 where the hardcopy should go in applications where sorting the hardcopy media to multiple output trays is desired. The barcodes could also determine the image processing performed by the image controller 440, and where the network controller 490 sends final images.

Figure 13:
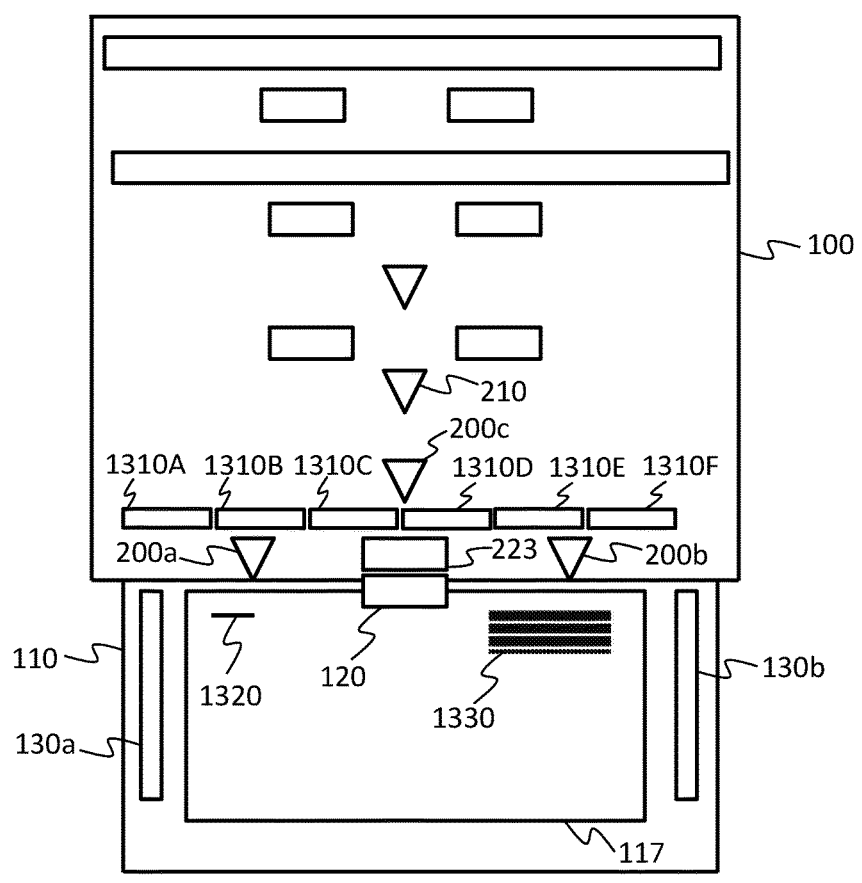
FIG. 13 is a diagram illustrating an alternative embodiment using a segmented induction detector.

FIG. 13 illustrates the system with multiple induction sensors 1310A-F positioned across the width of the media transport path 290. Induction sensors 1310A-F allow more flexibility for detection of metallic material with the ability to have detection "zones" that can be individually turned on and off. Monitoring different detection zones may provide a detection location within the media transport system indicating where a metallic object is presently located. In addition, having multiple zones allow some induction sensors 1310A-F to be allocated for detection of barcodes while others are used for staple detection. As an example, FIG. 13 shows a staple 1320 located in the upper left corner of top hardcopy medium 117 and a barcode pattern 1130 using metallic material on the right side of top hardcopy medium 117. Induction sensors 1310A-C could be configured for staple detection while induction sensors 1301D-F could be configured for barcode detection.

Figure 14:
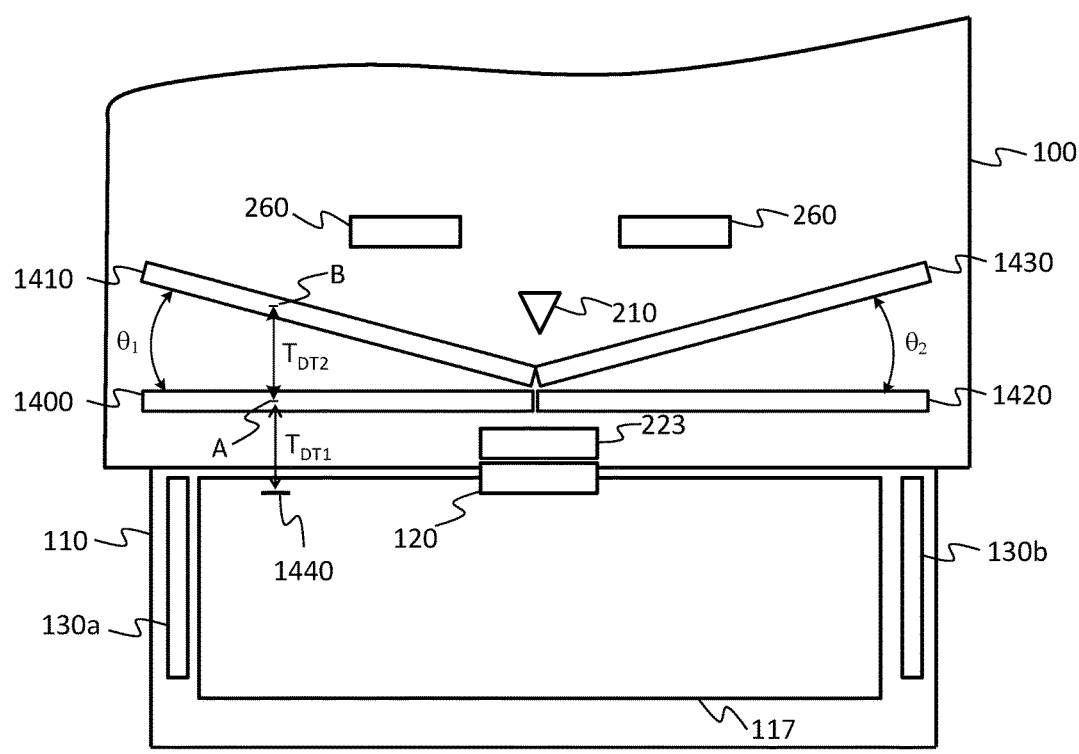
FIG. 14 is a diagram illustrating an alternative embodiment using a multiple induction detectors to find location of metallic objects.

FIG. 14 illustrates a configuration of the system where the location of the metallic object can be determined. In FIG. 14 induction sensors 1400, 1410, 1420, and 1430 are positioned across the width of the media transport path 290. Induction sensors 1400 and 1410 are arranged to form an angle $\theta_1$ and induction sensors 1420 and 1430 are arranged to form an angle $\theta_2$. When the transport driver unit 465 enables the urging rollers 120 and the feed rollers 223 to feed the top hardcopy medium 117, a top hardcopy medium 117 containing staple 1440 is pulled into the media transport path 290. Staple 1440 will pass induction sensor 1400 at location A after time delay TDT1 and then pass metal detector 1410 at location B after a delay TDT2.

Timer unit 480 is used to determine time delay TDT1, which represents the time from activating the transport driver unit 465 to enable the feed module 225 to feed the top hardcopy medium 117 to when staple 1440 crosses induction sensor 1400. Timer unit 480 is also used to determine time delay TDT2. Using the speed the transport driver unit 465 drives the motors, the location of the staple 1240 from the lead-edge of top hardcopy medium 117 is calculated from TDT1 and the distance between points A and B is calculated from TDT2.

Figure 15:
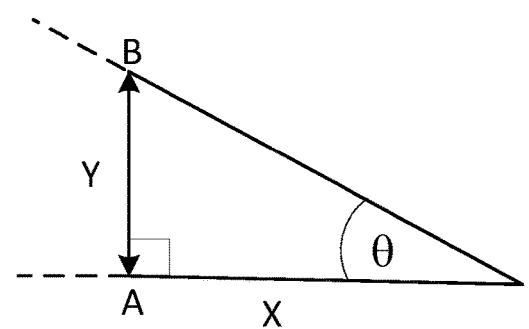
FIG. 15 is an illustration showing the relationship between metallic objects location and induction detector layout in FIG. 14.

FIG. 15 shows the right triangle formed when staple 1440 crosses induction sensors 1400 and 1410. The length of the segment AB, labeled Y is the distance between points A and B calculated from TDT2. The angle $\theta_1$ formed by induction sensors 1400 and 1410, as seen in FIG. 14, is represented by $\theta$ in FIG. 15. The value X represents the location of the staple 1440 on the top hardcopy media 117 relative to the center of the media transport path 290. Using the formula below, the length of X can be calculated.

$$X = \frac{Y}{\tan^{-1}(\theta)}$$

Figure 16:
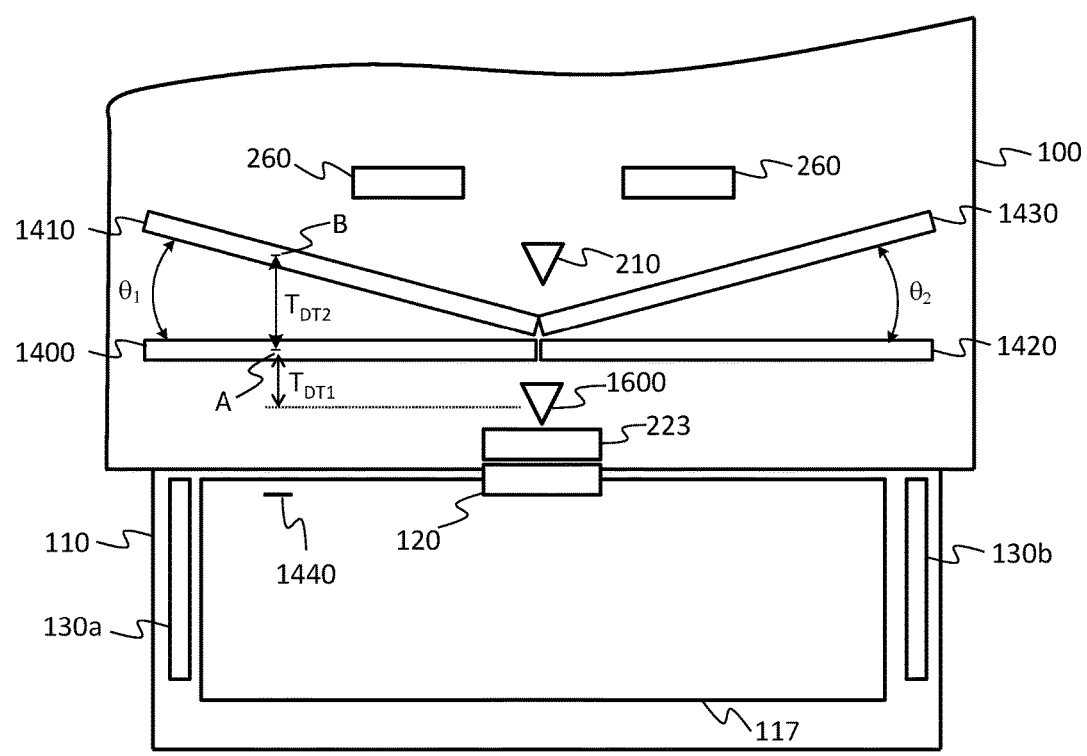
FIG. 16 is a diagram illustrating an alternative embodiment of in FIG. 14.

Sometimes, the lead-edge of top hardcopy media 117 might be pre-staged under the urging roller 120, or the urging roller 120 may spin on the top hardcopy media 117 before the top hardcopy media 117 begins to move. These two conditions would add error to the above calculations of the location of staple 1440. As seen in FIG. 16, media sensor 1600 may be added between induction sensors 1400 and 1420 and feed roller 223. Media sensor 1600 may provide more accurate location of the lead-edge by eliminating any error introduced by pre-staging or urging roller 120 spinning from the calculation to determine the location of staple 1440. In FIG. 16, the time delay TD1 is now measured from media sensor 1600 to when staple 1440 crosses induction sensor 1400.

Induction sensors 1420 and 1430 would function the same as induction sensors 1400 and 1410 if staple 1440 was located on the left side of the top hardcopy media 117. In addition, the exact positions of the induction sensors are not critical to locating staple 1440 as long as the induction sensors 1400 and 1420 are perpendicular to transport direction as shown by A4 and induction sensors 1410 and 1430 form a fixed angle in relation to induction sensors 1400 and 1420.

The invention claimed is:

1. A media transport system for detecting metallic objects in media to be input into the media transport system, comprising:

an input tray configured to hold media to be fed into the media transport system;

one or more rollers configured to convey the media from the input tray and along a medium transport path;

one or more induction sensors positioned near an entry point of media from the input tray into the medium transport path, wherein the one or more induction sensors are configured to detect presence of any metallic material and output a metallic detection signal;

a processing unit in communication with the one or more induction sensors, the processing unit configured to receive the metallic detection signal and further configured to analyze the signals and determine whether the media contains a metallic object; and at least one microphone located along the medium transport path, the at least one microphone configured to detect the sound of the medium being transported and produce a signal representing the sound, wherein the processing unit is configured to analyze the sound signals from the at least one microphone and indicate a presence of a medium jam based on the analyzed signals, and the processing unit is further configured to indicate the presence of a jam by comparing received sound signals to sound threshold levels, and further configured to adjust the sound level thresholds based on the metallic object detection signals.

2. The system of claim 1, wherein the metallic objects are at least one of staples, paper clips, barcodes, integrated circuits, and metallic foil.

3. The system of claim 1, further comprising a timing device configured to provide timing signals to the processing unit, wherein the timing signals include an indication of when the rollers are activated to convey a medium from the input tray into the medium transport path, an indication of when the one or more induction sensors detect the presence of a metallic object, and an indication of when the one or more induction sensors no longer detect presence of a metallic object.

4. The system of claim 3, wherein the processing unit is configured to determine the size or location of a metallic object on one or more of the media based on the position of the induction sensors, the position of the medium transport path, and the timing signals.

5. The system of claim 1, wherein the one or more rollers include a feed roller, and wherein at least one or of the one or more induction sensors is positioned near the feed roller in the media transport system.

6. The system of claim 1, wherein at least one or of the one or more induction sensors is located in the input tray.

7. The system of claim 1, wherein the at least one induction sensor includes a plurality of induction sensors, and wherein the processing unit is configured to determine the location of the metallic object on the media based on the metallic detection signals from the plurality of induction sensors.

8. The system of claim 1, wherein the processing unit is configured to combine the metallic detection signals with the sound signals to avoid false jam notifications resulting from hardcopy media with embedded metallic material.

9. The system of claim 1, wherein the media include at least one metallic barcode, and wherein the processing unit is configured to read the barcode based on metallic detection signals from the induction sensor.

10. A method of detecting metallic objects in media to be input into a media transport system, comprising:

placing one or more media into an input tray conveyed into the media transport system;

conveying the media from the input tray and along a medium transport path using one or more rollers;

detecting the presence of any metallic material with one or more induction sensors positioned near an entry point of media from the input tray into the medium transport path, and outputting a metallic detection signal;

receiving the metallic detection signal at a processing unit in communication with the one or more induction sensors, the processing unit analyzing the signals and determining whether the media contains a metallic object; and detecting the sound of the media being transported with at least one microphone located along the medium transport path, the at least one microphone producing a signal representing the sound, wherein the processing unit is configured to analyze the sound signals from the at least one microphone and indicate a presence of a medium jam based on the analyzed signals, and the processing unit is further configured to indicate the presence of a jam by comparing received sound signals to sound threshold levels, and further configured to adjust the sound level thresholds based on the metallic object detection signals.

11. The method of claim 10, wherein the metallic objects are at least one of staples, paper clips, barcodes, integrated circuits, and metallic foil.

12. The method of claim 10, further comprising providing timing signals from a timing device to the processing unit, wherein the timing signals include an indication of when the rollers are activated to convey a medium from the input tray into the medium transport path, an indication of when the one or more induction sensors detect the presence of a metallic object, and an indication of when the one or more induction sensors no longer detect presence of a metallic object.

13. The method of claim 12, wherein the processing unit determines the size or location of a metallic object on one or more of the media based on the position of the induction sensors, the position of the medium transport path, and the timing signals.

14. The method of claim 10, wherein the one or more rollers include a feed roller, and wherein at least one or of the one or more induction sensors is positioned near the feed roller in the media transport system.

15. The method of claim 10, wherein at least one or of the one or more induction sensors is located in the input tray.

16. The method of claim 10, wherein the at least one induction sensor includes a plurality of induction sensors, and wherein the processing unit determines the location of the metallic object on the media based on the metallic detection signals from the plurality of induction sensors.

* * * * *